June 28, 1938. C. R. BELL 2,122,052
CONVEYER BELT
Filed Dec. 17, 1936

Inventor
Charles R. Bell

By
Edward V. Hardware
Attorney.

Patented June 28, 1938

2,122,052

UNITED STATES PATENT OFFICE 2,122,052

CONVEYER BELT

Charles R. Bell, Rosharon, Tex.

Application December 17, 1936, Serial No. 116,309

5 Claims. (Cl. 198—199)

This invention relates to conveyer belts and has particular relation to improvements in that type of belt specially adapted for use on a harvesting machine, including a binder mechanism, and which has been particularly designed for harvesting grains such as wheat, oats, rice and similar grains.

It is another object of the invention to provide in a grain harvester a novel type of endless belt, or apron, employed for delivering the grain from the sickle to the binder mechanism.

The endless aprons or carriers with which the conventional harvester is equipped are usually composed of canvas which is usually provided with transverse cleats to engage and assist in moving the grain forwardly. These canvas aprons move over end rollers and are necessarily drawn taut. When the canvas becomes wet, as it will at times in use, it contracts and often tears thus necessitating the purchase of a new canvas and adding very materially to the expense of operation.

It is the prime object of this invention to provide an endless carrier, or canvas, for the purposes above specified, and having an elastic section therein of sufficient strength to maintain the canvas drawn taut while in operation, but which is sufficiently elastic to permit the canvas, when wet, to contract, without tearing, the elastic section taking up the contraction of the canvas.

As above stated the conventional canvas apron or carrier is provided with transverse cleats. These are usually made of wood and often become broken necessitating delay and repairs. It is a further object of this invention to provide an endless canvas carrier or conveyer, of the character described, having spaced transverse cleats formed of yieldable material such as rubber.

With the above and other objects in view the invention has particular relation to certain novel features of construction, operation and arrangement of parts, an example of which is given in the accompanying drawing wherein:—

Figure 1:
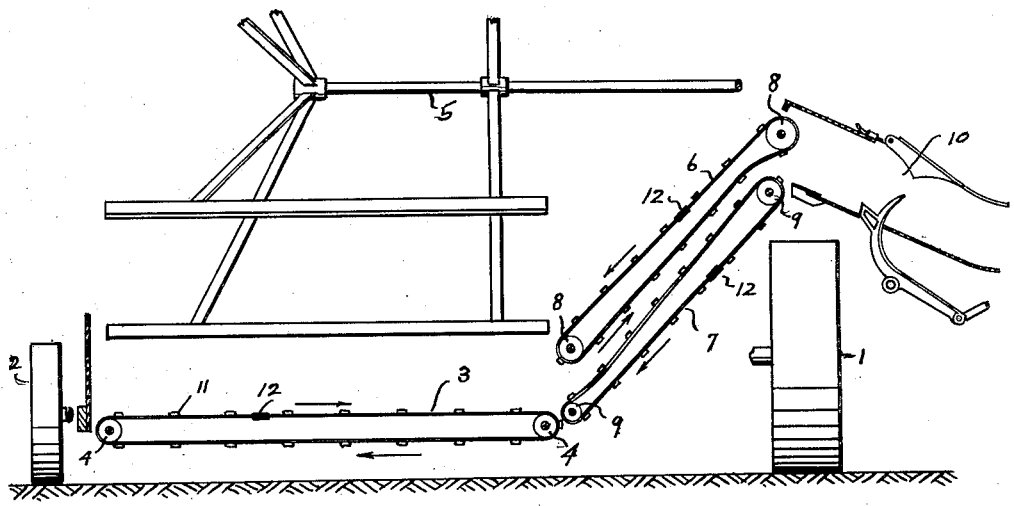
Figure 1 shows a fragmentary front elevation of a harvesting machine illustrating the endless aprons or carriers thereof.
Figure 2:
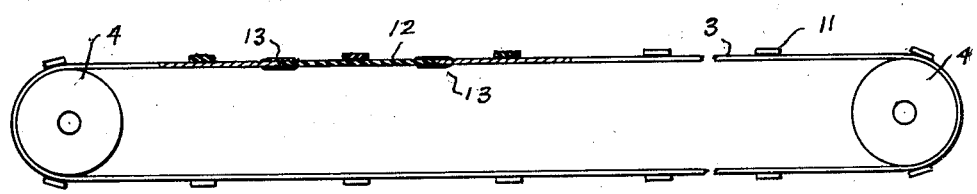
Figure 2 shows an elevational view of the canvas apron shown partly in section and mounted on the end rollers.
Figure 3:
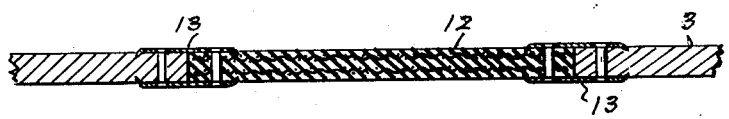
Figure 3 shows an enlarged, fragmentary sectional view of the carrier.

Referring now more particularly to the drawing wherein like numerals of reference designate the same parts in each of the figures, the numerals 1 and 2 designate the conventional carrier wheels of the harvesting machine between which the sickle (not shown) operates. Located rearwardly of the sickle there is the platform carrier 3 which is in the form of an endless apron mounted on the end rollers 4, 4. The carrier, or conveyer, 3 moves in the direction indicated by the arrows in Figure 1. The grain as cut is laid down on the apron, or platform, 3, by means of the reel 5 with which harvesters of this character are equipped. The conveyer 3 carries the grain toward, and delivers it to, the elevating carriers 6, 7 which operate around the end rollers 8, 8 and 9, 9 respectively. These elevating aprons, or carriers, 6, 7 revolve in the direction indicated by the arrows as shown in Figure 1. The grain passes up between the elevating carriers, or aprons, 6, 7 and is delivered to the binder mechanism designated generally by the numeral 10. The aprons, or carriers, 3, 6, 7 have the transverse cleats secured to the outer sides thereof to maintain them drawn taut transversely as well as to engage and advance the grain.

The conventional type of apron for this purpose is composed of canvas throughout and cleats 11 are usually composed of wood. If composed solely of canvas when the apron or conveyer becomes wet the material will contract and tear, and the cleats if formed of wood will readily become broken. In order to eliminate this tearing and breakage a section 12 of elastic material is inserted into the fabric of the carrier. The ends of this insert are secured to adjacent parts of the canvas in any preferred manner, found to be most practical, as for example the clamps as 13. This inserted elastic section may be composed entirely of rubber or of rubber and fabric. The inserted section is of substantially the same thickness as that of the canvas and the clamps 13 are of a form to present a substantially smooth outer surface.

The cleats 11 are preferably formed of rubber having sufficient rigidity to maintain the canvas drawn taut transversely and yet which will yield to prevent breakage.

The drawing and description disclose what is now considered to be a preferred form of the invention by way of illustration only while the broad principle of the invention will be defined by the appended claims.

What I claim is:—

1. In a harvesting machine an endless traveling apron formed of flexible, inelastic material and having an elastic section incorporated therein and extending from edge to edge of the belt.

2. In a harvesting machine a grain conveyer formed of an endless traveling apron composed of canvas and having an elastic section incorporated therein of the same width and thickness as the canvas and extending from edge to edge thereof to permit stretching of the belt lengthwise.

3. In a harvesting machine for grain, endless traveling aprons forming conveyers for the grain, each apron being composed of flexible, inelastic material with elastic sections of the same transverse dimensions as the inelastic portion incorporated in the conveyers.

4. A conveyer belt for a harvesting machine comprising an endless traveling apron forming a conveyer, the major portion of the belt being formed of flexible but inelastic material and a minor section of the belt being formed of elastic material of approximately the same width and thickness as that of the inelastic portion.

5. A conveyer belt for a harvesting machine comprising an endless traveling apron, the major portion of said apron being formed of canvas, said apron having an elastic section extending from edge to edge of the belt and being of substantially the same width and thickness as that of the canvas portion.

CHARLES R. BELL.